US009971305B2

(12) United States Patent
Ely et al.

(10) Patent No.: US 9,971,305 B2
(45) Date of Patent: *May 15, 2018

(54) TACTILE SWITCH FOR AN ELECTRONIC DEVICE

(71) Applicant: Apple Inc., Cupertino, CA (US)

(72) Inventors: Colin M. Ely, Sunnyvale, CA (US);
John B. Morrell, Los Gatos, CA (US);
Duncan Kerr, San Francisco, CA (US);
Camille Moussette, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/829,509

(22) Filed: Dec. 1, 2017

(65) Prior Publication Data

US 2018/0088532 A1    Mar. 29, 2018

Related U.S. Application Data

(63) Continuation of application No. 15/637,949, filed on Jun. 29, 2017, now Pat. No. 9,836,025, which is a
(Continued)

(51) Int. Cl.
*G04B 27/00* (2006.01)
*G06F 3/0488* (2013.01)
(Continued)

(52) U.S. Cl.
CPC ........... *G04B 27/002* (2013.01); *G04G 21/08* (2013.01); *G06F 1/163* (2013.01); *G06F 3/0362* (2013.01);
(Continued)

(58) Field of Classification Search
CPC ........ H01H 3/122; H01H 9/16; H01H 25/008; H01H 2215/006; H01H 2221/01;
(Continued)

(56) References Cited

U.S. PATENT DOCUMENTS

| 2,237,860 A | 4/1941 | Bolle |
| 2,288,215 A | 6/1942 | Taubert et al. |

(Continued)

FOREIGN PATENT DOCUMENTS

| CH | 1888928 | 1/1937 |
| CN | 1302740 | 9/2001 |

(Continued)

OTHER PUBLICATIONS

Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.
(Continued)

*Primary Examiner* — Edwin A. Leon
(74) *Attorney, Agent, or Firm* — Brownstein Hyatt Farber Schreck, LLP

(57) ABSTRACT

One embodiment of the disclosure includes an input module. The input module includes a switch, a rotatable and translatable input member operably connected to the switch and configured to actuate the switch, and an electrical contact operably connected to the switch and in electrical communication with the input member. During operation, the electrical connection between the input member and the electrical contact is maintained during translation and rotation of the input member. The input module may be used with a variety of electronic devices and can be used by a user to provide input to those devices.

20 Claims, 7 Drawing Sheets

Related U.S. Application Data continuation of application No. 15/465,523, filed on Mar. 21, 2017, now Pat. No. 9,709,956, which is a continuation of application No. 15/261,904, filed on Sep. 10, 2016, now Pat. No. 9,620,312, which is a continuation of application No. 14/455,375, filed on Aug. 8, 2014, now Pat. No. 9,627,163.

(60) Provisional application No. 61/864,389, filed on Aug. 9, 2013.

(51) Int. Cl.
  *G04G 21/08* (2010.01)
  *G06F 1/16* (2006.01)
  *G06F 3/0362* (2013.01)
  *H01H 25/00* (2006.01)

(52) U.S. Cl.
  CPC ......... *G06F 3/0488* (2013.01); *H01H 25/008* (2013.01); *H01H 2215/006* (2013.01); *H01H 2221/01* (2013.01); *H01H 2223/002* (2013.01)

(58) Field of Classification Search
  CPC ............. H01H 25/06; H01H 2209/006; H01H 2223/002; G06F 3/0362; G06F 1/163; G06F 3/0488; G04G 21/08
  USPC ....... 200/4; 368/69, 185–187, 289, 308, 319
  See application file for complete search history.

(56) References Cited

U.S. PATENT DOCUMENTS

| | | |
|---|---|---|
| 2,497,935 A | 2/1950 | Feurer |
| 2,771,734 A | 11/1956 | Morf |
| 2,788,236 A | 4/1957 | Kafowi |
| 2,797,592 A | 7/1957 | Marrapese |
| 3,040,514 A | 6/1962 | Dinstman |
| 3,056,030 A | 9/1962 | Kelchner |
| 3,130,539 A | 4/1964 | Davis |
| 3,355,873 A | 12/1967 | Morf |
| 3,410,247 A | 11/1968 | Dronberger |
| 3,495,398 A | 2/1970 | Widmer et al. |
| 3,621,649 A | 11/1971 | Vulcan et al. |
| 3,662,618 A | 5/1972 | Kroll et al. |
| 4,007,347 A | 2/1977 | Haber |
| 4,031,341 A | 6/1977 | Wuthrich et al. |
| 4,037,068 A | 7/1977 | Gaynor |
| 4,077,200 A | 3/1978 | Schneider |
| 4,133,404 A | 1/1979 | Griffin |
| 4,170,104 A | 10/1979 | Yamagata |
| 4,258,096 A | 3/1981 | Lamarche |
| 4,287,400 A | 9/1981 | Kitik |
| 4,289,400 A | 9/1981 | Kubola et al. |
| 4,311,026 A | 1/1982 | Ochoa |
| 4,311,990 A | 1/1982 | Burke |
| 4,324,956 A | 4/1982 | Sakakino et al. |
| 4,345,119 A | 8/1982 | Latasiewicz |
| 4,364,674 A | 12/1982 | Tesch |
| 4,379,642 A | 4/1983 | Meyrat |
| 4,395,134 A | 7/1983 | Luce |
| 4,417,824 A | 11/1983 | Paterson et al. |
| 4,581,509 A | 4/1986 | Sanford et al. |
| 4,600,316 A | 7/1986 | Besson |
| 4,617,461 A | 10/1986 | Subbarao et al. |
| 4,634,861 A | 1/1987 | Ching et al. |
| 4,641,026 A | 2/1987 | Garcia, Jr. |
| 4,670,737 A | 6/1987 | Rilling |
| 4,766,642 A | 8/1988 | Gaffney et al. |
| 4,783,772 A | 11/1988 | Umemoto et al. |
| 4,884,073 A | 11/1989 | Souloumiac |
| 4,914,831 A | 4/1990 | Kanezashi et al. |
| 4,922,070 A | 5/1990 | Dorkinski |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,034,602 A | 7/1991 | Garcia et al. |
| 5,214,278 A | 5/1993 | Banda |
| 5,258,592 A | 11/1993 | Nishikawa et al. |
| 5,288,993 A | 2/1994 | Bidiville et al. |
| 5,347,123 A | 9/1994 | Jackson et al. |
| 5,383,166 A | 1/1995 | Gallay |
| 5,471,054 A | 11/1995 | Watanabe |
| 5,509,174 A | 4/1996 | Worrell |
| 5,572,314 A | 11/1996 | Hyman et al. |
| 5,583,560 A | 12/1996 | Florin et al. |
| 5,726,645 A | 3/1998 | Kamon et al. |
| 5,748,111 A | 5/1998 | Bates |
| 5,825,353 A | 10/1998 | Will |
| 5,841,050 A | 11/1998 | Clift et al. |
| 5,847,335 A | 12/1998 | Sugahara et al. |
| 5,867,082 A | 2/1999 | Van Zeeland |
| 5,943,233 A | 8/1999 | Ebina |
| 5,953,001 A | 9/1999 | Challener et al. |
| 5,963,332 A | 10/1999 | Feldman et al. |
| 6,069,567 A | 5/2000 | Zawilski |
| 6,134,189 A | 10/2000 | Carrard |
| 6,154,201 A | 11/2000 | Levin et al. |
| 6,175,679 B1 | 1/2001 | Veligdan et al. |
| 6,246,050 B1 | 6/2001 | Tullis et al. |
| 6,252,825 B1 | 6/2001 | Perotto |
| 6,304,247 B1 | 10/2001 | Black |
| 6,355,891 B1 | 3/2002 | Ikunami |
| 6,392,640 B1 | 5/2002 | Will |
| 6,422,740 B1 | 7/2002 | Leuenberger |
| 6,477,117 B1 | 11/2002 | Narayanaswami et al. |
| 6,502,982 B1 | 1/2003 | Bach et al. |
| 6,525,278 B2 | 2/2003 | Villain et al. |
| 6,556,222 B1 | 4/2003 | Narayanaswami |
| 6,575,618 B1 | 6/2003 | Inoue et al. |
| 6,587,400 B1* | 7/2003 | Line ..................... G04C 10/00 368/204 |
| 6,646,635 B2 | 11/2003 | Pogatetz et al. |
| 6,661,438 B1 | 11/2003 | Shiraishi et al. |
| 6,672,758 B2 | 1/2004 | Ehrsam et al. |
| 6,794,992 B1 | 9/2004 | Rogers |
| 6,809,275 B1 | 10/2004 | Cheng et al. |
| 6,834,430 B2 | 12/2004 | Worrell |
| 6,846,998 B2* | 1/2005 | Hasumi ................... G04C 3/001 200/341 |
| 6,888,076 B2 | 5/2005 | Hetherington |
| 6,896,403 B1 | 5/2005 | Gau |
| 6,909,378 B1 | 6/2005 | Lambrechts et al. |
| 6,914,551 B2 | 7/2005 | Vidal |
| 6,961,099 B2 | 11/2005 | Takano et al. |
| 6,963,039 B1 | 11/2005 | Weng et al. |
| 6,985,107 B2 | 1/2006 | Anson |
| 6,987,568 B2 | 1/2006 | Dana |
| 6,998,553 B2 | 2/2006 | Hisamune et al. |
| 7,016,263 B2 | 3/2006 | Gueissaz et al. |
| 7,034,237 B2* | 4/2006 | Ferri ................. H01R 13/6485 200/341 |
| 7,081,905 B1 | 7/2006 | Raghunath et al. |
| 7,102,626 B2 | 9/2006 | Denny, III |
| 7,111,365 B1 | 9/2006 | Howie, Jr. |
| 7,119,289 B2 | 10/2006 | Lacroix |
| 7,135,673 B2 | 11/2006 | Saint Clair |
| 7,167,083 B2 | 1/2007 | Giles |
| 7,244,927 B2 | 7/2007 | Huynh |
| 7,255,473 B2 | 8/2007 | Hiranuma et al. |
| 7,265,336 B2 | 9/2007 | Hataguchi et al. |
| 7,274,303 B2 | 9/2007 | Dresti et al. |
| 7,285,738 B2 | 10/2007 | Lavigne et al. |
| 7,292,741 B2 | 11/2007 | Ishiyama et al. |
| 7,358,481 B2 | 4/2008 | Yeoh et al. |
| 7,369,308 B2 | 5/2008 | Tsuruta et al. |
| 7,371,745 B2 | 5/2008 | Ebright et al. |
| 7,404,667 B2 | 7/2008 | Born et al. |
| 7,465,917 B2 | 12/2008 | Chin et al. |
| 7,520,664 B2 | 4/2009 | Wai |
| 7,528,824 B2 | 5/2009 | Kong |
| 7,545,367 B2 | 6/2009 | Sunda et al. |
| 7,591,582 B2 | 9/2009 | Hiranuma et al. |

(56) References Cited

U.S. PATENT DOCUMENTS

| | | |
|---|---|---|
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,710,456 B2 | 5/2010 | Koshiba et al. |
| 7,732,724 B2 | 6/2010 | Otani et al. |
| 7,761,246 B2 | 7/2010 | Matsui |
| 7,763,819 B2 | 7/2010 | Leda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,597 B2 | 9/2010 | Silverstein et al. |
| 7,856,255 B2 | 12/2010 | Tsuchiya et al. |
| 7,858,583 B2 | 12/2010 | Schmidt et al. |
| 7,865,324 B2 | 1/2011 | Lindberg |
| 8,063,892 B2 | 11/2011 | Shahoian et al. |
| 8,138,488 B2 | 3/2012 | Grot |
| 8,143,981 B2 | 3/2012 | Washizu et al. |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,312,495 B2 | 11/2012 | Vanderhoff |
| 8,368,677 B2 | 2/2013 | Yamamoto |
| 8,371,745 B2 | 2/2013 | Manni |
| 8,373,661 B2 | 2/2013 | Lan et al. |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,477,118 B2 | 7/2013 | Lan et al. |
| 8,493,190 B2 | 7/2013 | Periquet et al. |
| 8,508,511 B2 | 8/2013 | Tanaka et al. |
| 8,525,777 B2 | 9/2013 | Stavely et al. |
| 8,568,313 B2 | 10/2013 | Sadhu |
| 8,576,044 B2 | 11/2013 | Chapman |
| 8,593,598 B2 | 11/2013 | Chen et al. |
| 8,607,662 B2 | 12/2013 | Huang |
| 8,614,881 B2 | 12/2013 | Yoo |
| 8,783,944 B2 | 2/2014 | Doi |
| 8,666,682 B2 | 3/2014 | LaVigne et al. |
| 8,704,787 B2 | 4/2014 | Yamamoto |
| 8,711,093 B2 | 4/2014 | Ong et al. |
| 8,724,087 B2 | 5/2014 | Van De Kerkhof et al. |
| 8,730,167 B2 | 5/2014 | Ming et al. |
| 8,743,088 B2 | 6/2014 | Watanabe |
| 8,804,993 B2 | 8/2014 | Shukla et al. |
| 8,824,245 B2 | 9/2014 | Lau et al. |
| 8,847,741 B2 | 9/2014 | Birnbaum et al. |
| 8,859,971 B2 | 10/2014 | Weber |
| 8,860,674 B2 | 10/2014 | Lee et al. |
| 8,863,219 B2 | 10/2014 | Brown et al. |
| 8,878,657 B2 | 11/2014 | Periquet et al. |
| 8,885,856 B2 | 11/2014 | Sacha |
| 8,895,911 B2 | 11/2014 | Takahashi |
| 8,905,631 B2 | 12/2014 | Sakurazawa et al. |
| 8,920,022 B2 | 12/2014 | Lshida et al. |
| 8,922,399 B2 | 12/2014 | Bajaj et al. |
| 8,928,452 B2 | 1/2015 | Kim et al. |
| 8,994,827 B2 | 3/2015 | Mistry et al. |
| 9,024,733 B2 | 5/2015 | Wouters |
| 9,028,134 B2 | 5/2015 | Koshoji et al. |
| 9,041,663 B2 | 5/2015 | Westerman |
| 9,052,696 B2 | 6/2015 | Breuillot et al. |
| 9,086,717 B2 | 7/2015 | Meerovitsch |
| 9,086,738 B2 | 7/2015 | Leung et al. |
| 9,105,413 B2 | 8/2015 | Hiranuma et al. |
| 9,123,483 B2 | 9/2015 | Ferri et al. |
| 9,176,598 B2 | 11/2015 | Sweetser et al. |
| 9,202,372 B2 | 12/2015 | Reams et al. |
| 9,213,409 B2 | 12/2015 | Redelsheimer et al. |
| 9,223,296 B2 | 12/2015 | Yang et al. |
| 9,244,438 B2 | 1/2016 | Hoover et al. |
| 9,277,156 B2 | 3/2016 | Bennett et al. |
| 9,350,850 B2 | 5/2016 | Pope et al. |
| 9,430,042 B2 | 8/2016 | Levin |
| 9,437,357 B2 | 9/2016 | Furuki et al. |
| 9,449,770 B2 | 9/2016 | Sanford et al. |
| 9,542,016 B2 | 1/2017 | Armstrong-Muntner |
| 9,607,505 B2 | 3/2017 | Rothkopf et al. |
| 9,620,312 B2 * | 4/2017 | Ely .................. H01H 3/122 |
| 9,627,163 B2 | 4/2017 | Ely |
| 9,638,587 B2 | 5/2017 | Marquas et al. |
| 9,709,956 B1 * | 7/2017 | Ely .................. H01H 3/122 |
| 9,753,436 B2 | 9/2017 | Ely et al. |
| 9,800,717 B2 | 10/2017 | Ma et al. |
| 9,836,025 B2 * | 12/2017 | Ely .................. G04B 27/002 |
| 2003/0174590 A1 | 9/2003 | Arikawa et al. |
| 2004/0082414 A1 | 4/2004 | Knox |
| 2004/0130971 A1 | 7/2004 | Ecoffet et al. |
| 2004/0264301 A1 | 12/2004 | Howard et al. |
| 2005/0075558 A1 | 4/2005 | Vecerina et al. |
| 2006/0250377 A1 | 11/2006 | Zadesky et al. |
| 2007/0013775 A1 | 1/2007 | Shin |
| 2007/0050054 A1 | 3/2007 | Sambandam Guruparan et al. |
| 2007/0211042 A1 | 9/2007 | Kim et al. |
| 2007/0222756 A1 | 9/2007 | Wu et al. |
| 2007/0229671 A1 | 10/2007 | Takeshita et al. |
| 2007/0247421 A1 | 10/2007 | Orsley et al. |
| 2008/0130914 A1 | 6/2008 | Cho |
| 2009/0051649 A1 | 2/2009 | Rondel |
| 2009/0073119 A1 | 3/2009 | Le et al. |
| 2009/0122656 A1 | 5/2009 | Bonnet et al. |
| 2009/0146975 A1 | 6/2009 | Chang |
| 2009/0152452 A1 | 6/2009 | Lee et al. |
| 2009/0217207 A1 | 8/2009 | Kagermeier et al. |
| 2009/0285443 A1 | 11/2009 | Camp et al. |
| 2009/0312051 A1 | 12/2009 | Hansson et al. |
| 2010/0033430 A1 | 2/2010 | Kakutani et al. |
| 2010/0053468 A1 | 3/2010 | Havrill |
| 2010/0081375 A1 | 4/2010 | Rosenblatt et al. |
| 2010/0149099 A1 | 6/2010 | Elias |
| 2011/0007468 A1 | 1/2011 | Burton et al. |
| 2011/0090148 A1 | 4/2011 | Li et al. |
| 2011/0242064 A1 | 10/2011 | Ono et al. |
| 2012/0067711 A1 | 3/2012 | Yang |
| 2012/0068857 A1 | 3/2012 | Rothkopf et al. |
| 2012/0075082 A1 | 3/2012 | Rothkopf et al. |
| 2012/0112859 A1 | 5/2012 | Park et al. |
| 2012/0113044 A1 | 5/2012 | Strazisar et al. |
| 2012/0206248 A1 | 8/2012 | Biggs |
| 2012/0272784 A1 | 11/2012 | Bailey et al. |
| 2013/0037396 A1 | 2/2013 | Yu |
| 2013/0087443 A1 | 4/2013 | Kikuchi |
| 2013/0215724 A1 * | 8/2013 | Hiranuma ............... H01H 9/20 368/319 |
| 2013/0335196 A1 | 12/2013 | Zhang et al. |
| 2014/0071098 A1 | 3/2014 | You |
| 2014/0132516 A1 | 5/2014 | Tsai et al. |
| 2014/0197936 A1 | 7/2014 | Biggs et al. |
| 2014/0327630 A1 | 11/2014 | Burr et al. |
| 2014/0340318 A1 | 11/2014 | Stringer et al. |
| 2014/0347289 A1 | 11/2014 | Suh et al. |
| 2015/0221460 A1 | 8/2015 | Teplitxky et al. |
| 2015/0227217 A1 | 8/2015 | Fukumoto |
| 2016/0054813 A1 | 2/2016 | Shediwy et al. |
| 2016/0058375 A1 | 3/2016 | Rothkopf et al. |
| 2016/0061636 A1 | 3/2016 | Gowreesunker et al. |
| 2016/0062623 A1 | 3/2016 | Howard et al. |
| 2016/0069713 A1 | 3/2016 | Ruh et al. |
| 2016/0103985 A1 | 4/2016 | Shim et al. |
| 2016/0109861 A1 | 4/2016 | Kim et al. |
| 2016/0116306 A1 | 4/2016 | Ferri et al. |
| 2016/0168178 A1 | 6/2016 | Hoover et al. |
| 2016/0253487 A1 | 9/2016 | Sarkar et al. |
| 2016/0258784 A1 | 9/2016 | Boonsom et al. |
| 2016/0259301 A1 | 9/2016 | Ely |
| 2016/0306437 A1 | 10/2016 | Zhang et al. |
| 2016/0306446 A1 | 10/2016 | Chung et al. |

(56) References Cited

U.S. PATENT DOCUMENTS

| | | | |
|---|---|---|---|
| 2016/0313703 | A1 | 10/2016 | Ely et al. |
| 2016/0327911 | A1 | 11/2016 | Eim et al. |
| 2016/0378069 | A1 | 12/2016 | Rothkopf et al. |
| 2016/0378070 | A1 | 12/2016 | Rothkopf et al. |
| 2016/0378071 | A1 | 12/2016 | Rothkopf et al. |
| 2016/0378072 | A1 | 12/2016 | Ely et al. |
| 2017/0003655 | A1 | 1/2017 | Ely |
| 2017/0010751 | A1 | 1/2017 | Shedletsky |
| 2017/0045958 | A1 | 2/2017 | Battlogg et al. |
| 2017/0061863 | A1 | 3/2017 | Eguchi |
| 2017/0069443 | A1 | 3/2017 | Wang et al. |
| 2017/0069444 | A1 | 3/2017 | Wang et al. |
| 2017/0069447 | A1 | 3/2017 | Wang et al. |
| 2017/0104902 | A1 | 4/2017 | Kim et al. |
| 2017/0139489 | A1 | 5/2017 | Chen et al. |
| 2017/0248986 | A1 | 8/2017 | Jackson et al. |
| 2017/0269715 | A1 | 9/2017 | Kim et al. |
| 2017/0285404 | A1 | 10/2017 | Kubota et al. |
| 2017/0307414 | A1 | 10/2017 | Ferri et al. |
| 2017/0308039 | A1 | 10/2017 | Ely et al. |
| 2017/0331869 | A1 | 11/2017 | Bendahan et al. |
| 2017/0357465 | A1 | 12/2017 | Dzeryn et al. |

FOREIGN PATENT DOCUMENTS

| | | |
|---|---|---|
| CN | 1445627 | 10/2003 |
| CN | 1504843 | 6/2004 |
| CN | 1624427 | 6/2005 |
| CN | 1792295 | 6/2006 |
| CN | 101201587 | 6/2008 |
| CN | 201081979 | 7/2008 |
| CN | 101750958 | 6/2010 |
| CN | 101923314 | 12/2010 |
| CN | 202008579 | 10/2011 |
| CN | 102890443 | 1/2013 |
| CN | 202710937 | 1/2013 |
| CN | 103191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103956006 | 7/2014 |
| CN | 203693601 | 7/2014 |
| CN | 203732900 | 7/2014 |
| CN | 103995456 | 8/2014 |
| CN | 203941395 | 11/2014 |
| CN | 104880937 | 9/2015 |
| CN | 105096979 | 11/2015 |
| CN | 105547146 | 5/2016 |
| DE | 3706194 | 9/1988 |
| DE | 102008023651 | 11/2009 |
| EP | 0556155 | 8/1993 |
| EP | 1345095 | 9/2003 |
| EP | 1669724 | 6/2006 |
| EP | 1832969 | 9/2007 |
| EP | 2375295 | 10/2011 |
| EP | 2720129 | 4/2014 |
| FR | 2030093 | 10/1970 |
| FR | 2801402 | 5/2001 |
| GB | 2433211 | 6/2007 |
| JP | S5734457 | 2/1982 |
| JP | H05203465 | 8/1993 |
| JP | 11121210 | 4/1999 |
| JP | 2001202178 | 7/2001 |
| JP | 2003151410 | 5/2003 |
| JP | 2003331693 | 11/2003 |
| JP | 2004184396 | 7/2004 |
| JP | 2007311153 | 11/2007 |
| JP | 2008053980 | 3/2008 |
| JP | 2008122377 | 5/2008 |
| JP | 2008235226 | 10/2008 |
| JP | 2010186572 | 8/2010 |
| JP | 2011165468 | 8/2011 |
| JP | 2013079961 | 5/2013 |
| KR | 20080045397 | 5/2008 |
| NL | 1040225 | 11/2014 |
| TW | 200633681 | 10/2006 |
| WO | WO2001/022038 | 3/2001 |
| WO | WO2001/069567 | 9/2001 |
| WO | WO2010/058376 | 5/2010 |
| WO | WO2012/083380 | 6/2012 |
| WO | WO2012/094805 | 7/2012 |
| WO | WO2014/018118 | 1/2014 |
| WO | WO2015/147756 | 10/2015 |
| WO | WO2016/155761 | 10/2016 |

OTHER PUBLICATIONS

Author Unknown, "mHealth," http://mhealth.vesag.com/?m=201012, 7 pages, Dec. 23, 2010.
Author Unknown, "mHealth Summit 2010," http://www.virtualpressoffice.com/eventsSubmenu.do?page=exhibitorPage&showId=1551&companyId=5394, 5 pages, Nov. 18, 2010.
Author Unknown, "RedEye mini Plug-in Universal Remote Adapter for iPhone, iPod touch and iPad," Amazon.com, 4 pages, date unknown.
Author Unknown, "Re iPhone Universal Remote Control—Infrared Remote Control Accessory for iPhone and iPod touch," http://www.amazon.com/iPhone-Universal-Remote-Control-Accessory/dp/tech-data/B0038Z4 . . . , 2 pages, at least as early as Jul. 15, 2010.
Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.
Author Unknown, "Vyzin Electronics Private Limited launches" Vesag Watch, http://www.virtualpressoffice.com/showJointPage.do?page=jp&showId=1544, 5 pages, Jan. 6, 2011.
Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.
Author Unknown, "DeskThorityNet, Optical Switch Keyboards," http://deskthority.net/keyboards-f2/optical-switch-keyboards-t1474.html, 22 pages, Jul. 11, 2015.
Epstein et al., "Economical, High-Performance Optical Encoders," Hewlett-Packard Journal, pp. 99-106, Oct. 1988. [text only version].
GreyB, "Google Watch: Convert your arm into a keyboard," http://www.whatafuture.com/2014/02/28/google-smartwatch/#sthash.Yk35cDXK.dpbs, 3 pages, Feb. 28, 2014.
IBM, "Additional Functionality Added to Cell Phone via "Learning" Function Button," www.ip.com, 2 pages, Feb. 21, 2007.
Kim, Joseph, "2010 mHealth Summit Emerges as Major One-Stop U.S. Venue for Mobile Health," http://www.medicineandtechnology.com/2010/08/ 2010-mhealth-summit-emerges-as-major.html, 3 pages, Aug. 26, 2010.
Krishnan et al., "A Miniature Surface Mount Reflective Optical Shaft Encoder," Hewlett-Packard Journal, Article 8, pp. 1-6, Dec. 1996.
Rick, "How VESAG Helps Health Conscious Citizens," http://sensetekgroup.com/2010/11/29/wireless-health-monitoring-system/, 2 pages, Nov. 29, 2010.
Sadhu, Rajendra, "How Vesag Helps People Who Want to 'Be There'?," http://ezinearticles.com/?How-Vesag-Helps-People-Who-Want-to-Be-There?&id=5423873, 1 page, Nov. 22, 2010.
Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.
Sherr, Sol, "Input Devices," p. 55, Mar. 1988.
Tran et al., "Universal Programmable Remote Control/Telephone," www.ip.com, 2 pages, May 1, 1992.
International Search Report and Written Opinion, PCT/US2014/050358, 10 pages, dated Nov. 10, 2014.
Author Unknown, "Desirable Android Wear smartwatch from LG," Gulf News, Dubai, 3 pages, Jan. 30, 2015.

(56) References Cited

OTHER PUBLICATIONS

Author Unknown, "Fossil Q ups smartwatch game with handsome design and build," Business Mirror, Makati City, Philippines, 3 pages, Dec. 20, 2016.

Author Unknown, "MyKronoz ZeTime: World's Most Funded Hybrid Smartwatch Raised over $3M on Kickstarter, Running until Apr. 27th," Business Wire, New York, New York, 3 pages, Apr. 21, 2017.

* cited by examiner

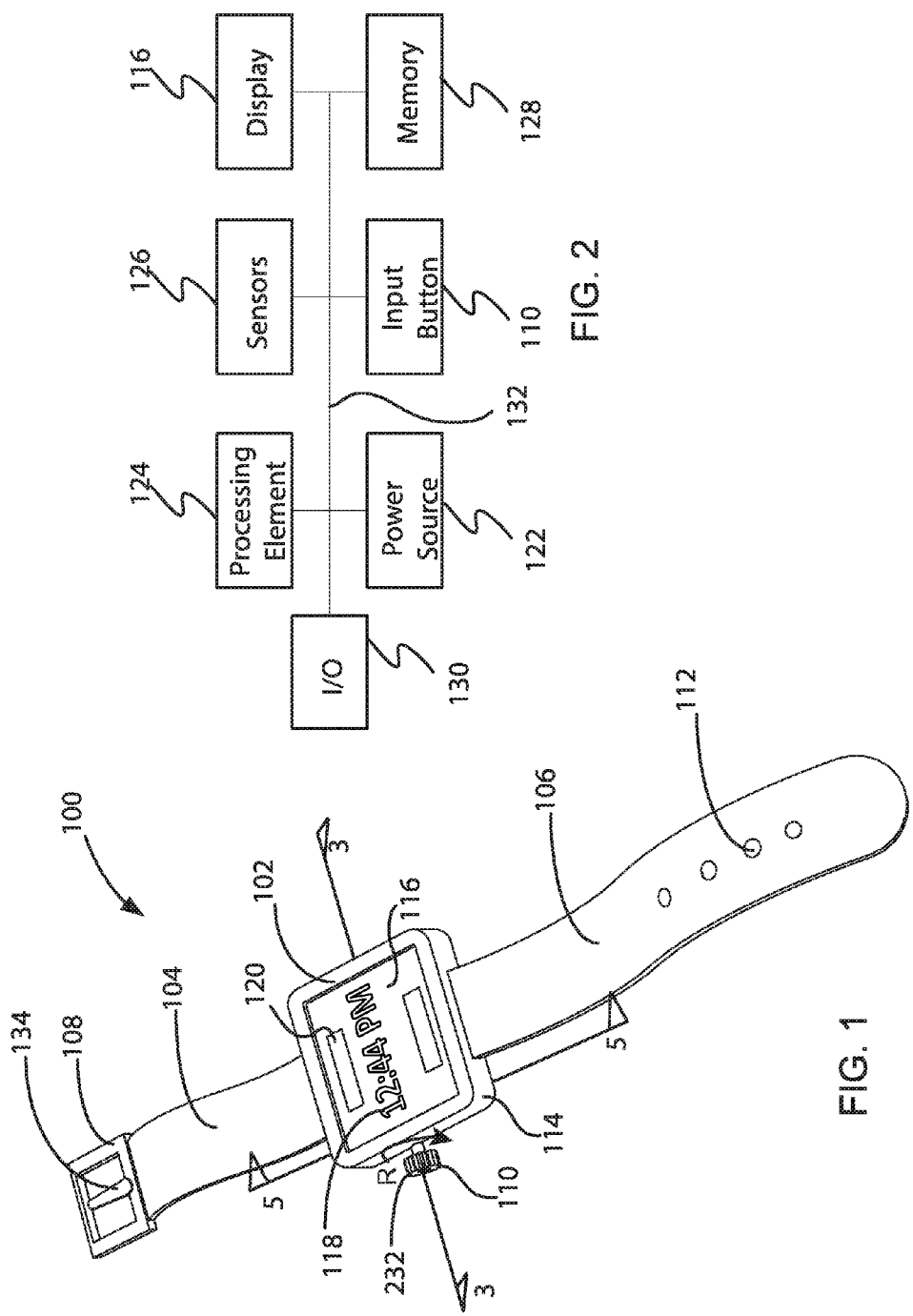

TACTILE SWITCH FOR AN ELECTRONIC DEVICE

CROSS-REFERENCE TO RELATED APPLICATION

This patent application is a continuation patent application of U.S. patent application Ser. No. 15/637,949, filed Jun. 29, 2017 and titled "Tactile Switch for an Electronic Device," which is a continuation patent application of U.S. patent application Ser. No. 15/465,523, filed Mar. 21, 2017, and titled "Tactile Switch for an Electronic Device," now U.S. Pat. No. 9,709,956, which is a continuation patent application of U.S. patent application Ser. No. 15/261,904, filed Sep. 10, 2016, and titled "Tactile Switch for an Electronic Device," now U.S. Pat. No. 9,620,312, issued Apr. 11, 2017, which is a continuation patent application of U.S. patent application Ser. No. 14/455,375, filed Aug. 8, 2014, and titled "Tactile Switch for an Electronic Device," now U.S. Pat. No. 9,627,163, issued Apr. 18, 2017, which is a nonprovisional patent application of and claims priority to U.S. Provisional Patent Application No. 61/864,389, filed Aug. 9, 2013, and titled "Tactile Switch for an Electronic Device," the disclosures of which are hereby incorporated herein reference in their entireties.

TECHNICAL FIELD

The present disclosure relates generally to electronic devices, and more specifically, to input devices for computing devices.

BACKGROUND

Many types of electronic devices, such as smart phones, gaming devices, computers, watches, and the like, use input devices, such as buttons or switches, to receive user input. However, many input devices, such as buttons or switches, may allow only a single type of input. For example, a button may only transmit one type of signal, which is a compression of a button that completes a circuit. As electronic devices reduce in size, it may be desirable to have fewer input buttons or devices, without reducing functionality or the number of input types that can be used by a user to provide information to a device. Further, in instances where the button or switch may be movable or rotatable, the button may not be able to include a sensor or other electronic element that requires data and/or power to be transferred between the button and one or more components of the electronic device, as the movement may make an electrical connection difficult.

SUMMARY

One example of the present disclosure takes the form of an input module. The input module includes a switch, a rotatable and translatable input member operably connected to the switch and configured to actuate the switch, and an electrical contact operably connected to the switch and in electrical communication with the input member. During operation, the electrical connection between the input member and the electrical contact is maintained during translation and rotation of the input member. The input module may be used with a variety of electronic devices and can be used by a user to provide input to those devices.

Another example of the disclosure takes the form of a switch assembly. The switch assembly includes a rotatable and translatable input member, a coupling operable connected to the input member and moveable therewith, a tactile switch operably connected to the coupling, and an electrical contact operably connected to the tactile switch and in electrical communication with the coupling. The input member is configured to actuate the electrical component when the input member translates, and the coupling rotates as the input member rotates. Additionally, the electrical connection between the coupling and the electrical contact is maintained during translation and rotation of the input member.

Yet another example of the disclosure includes a wearable electronic device. The wearable electronic device includes an enclosure defining a cavity and a button aperture defined through the enclosure. The wearable electronic device also includes one or more processing elements received within the cavity, and a switch module operably connected to the enclosure. The switch module includes a tactile switch in communication with the processing element, a rotatable and translatable input member operably connected to the tactile switch, and a contact operably connected to the tactile switch and electrically coupled to the input member. During operation, the electrical coupling between the input member and the contact is maintained during translation and rotation of the input member.

BRIEF DESCRIPTION OF THE DRAWINGS

FIG. 1 is a top plan view of a wearable electronic device including a multi-input device.

FIG. 2 is a simplified block diagram of the wearable electronic device.

DETAILED DESCRIPTION

Overview

Figure 3:
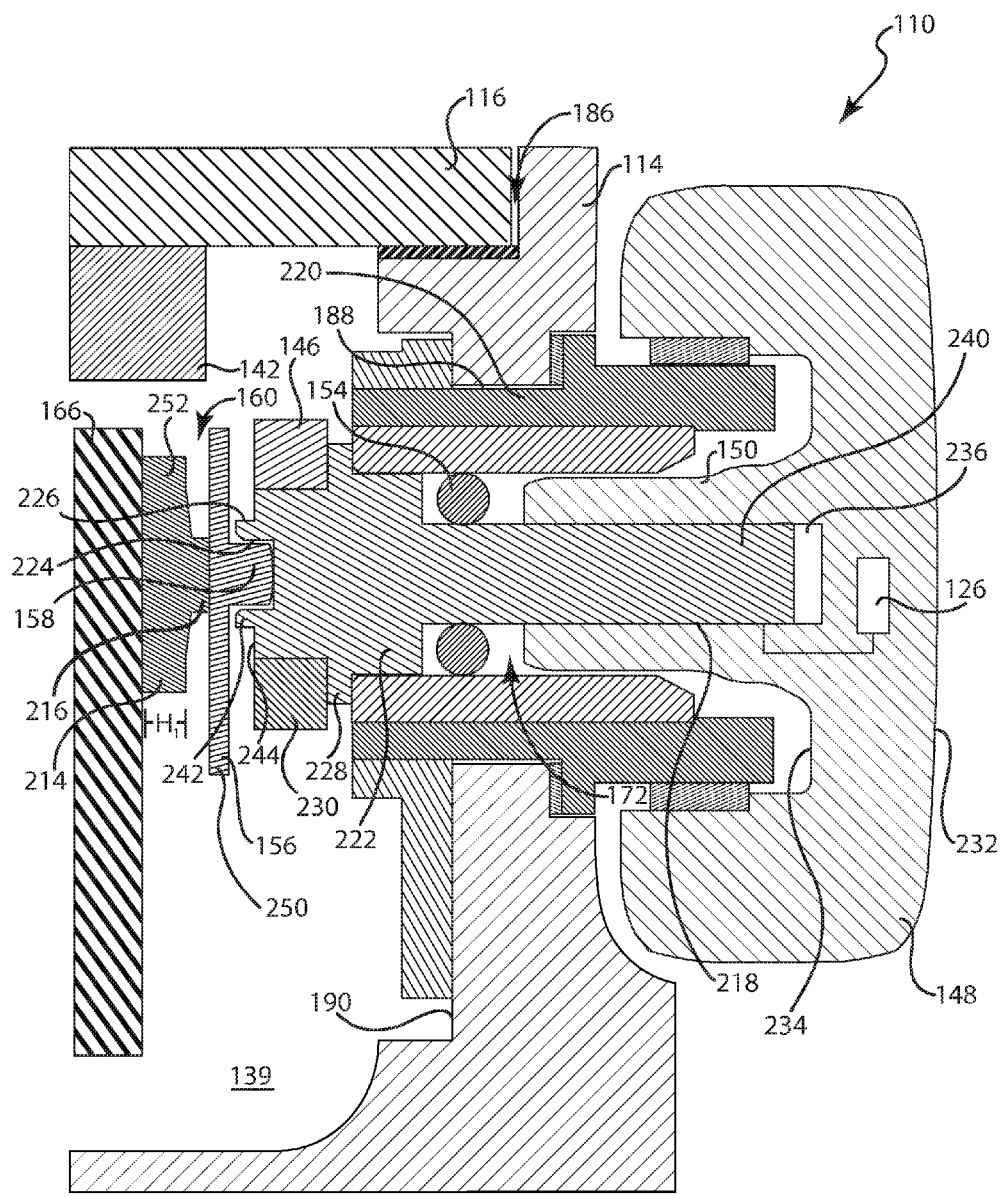
FIG. 3 is a cross-section view of the wearable electronic device taken along line 3-3 in FIG. 1.

Some embodiments of the present disclosure include a tactile switch assembly. The tactile switch assembly may be implemented in a number of electronic devices. In some embodiments, the tactile switch assembly may be incorporated into a portable electronic device such as a wearable electronic device, laptop computer, tablet, or the like. The wearable electronic device may be a watch, portable music player, computing or gaming device, smart phone, or the like. In some embodiments, the wearable electronic device is a watch that can be worn around the wrist of a user. In these embodiments, the tactile switch assembly may include a button that forms a crown for the watch and is connected to a sidewall of an enclosure for the device.

The tactile switch assembly includes a tactile switch, a user input member, and a shear plate or an electrical contact. The user input member, which may be a button, switch, flange, or the like, can provide a first type of input to the tactile switch by mechanically activating the switch. For example, the tactile switch may include a dome that compresses due to a translating user force to the input button and, upon compression, the tactile switch creates a signal indicating the user input. In this example, the compression of the dome may also provide feedback to a user, e.g., tactile feedback.

The shear plate may electrically connect the tactile switch and the user input button so that electrical signals are transmittable between the tactile switch and the user input button and/or between the tactile switch and one or more electrical components (e.g., sensors) on the user input button. In other embodiments, electrical signals, power and the like may be routed between the switch and button by a flex, wire, trace or other electrical element that is attached to the shear plate and button. The shear plate also acts to prevent shear forces from being transmitted to the tactile switch, preventing the tactile switch from being damaged. The user input button may also provide a second type of input to the tactile switch assembly. For example, the user input member may be rotatable relative to the tactile switch. Continuing with this example, the shear plate may be positioned between the tactile switch and the user input button, allowing the user input member to remain in communication with the shear plate even as the user input member is rotated relative thereto. For example, the shear plate may include a brush contact that maintains an electrical connection with the user input member as the user input button is rotated.

In some embodiments the tactile switch assembly may be used as a physiologic sensor and/or may be used in connection with a biometric sensor, although it should be appreciated that the sensor may be omitted from certain embodiments. In a specific embodiment, the wearable electronic device may be used to measure electrical parameters of a user's body, such as heart rate, electrical activity of the heart, and so on. As one example, the tactile switch assembly may be used to capture a user's electrocardiography. In this example, the wearable device may include a first user contact location and the user input button may form a second user contact location when touched by a user. In this embodiment, the two contacts may create an electrical path between the user and the device that allows the device to sense the user's heart rate. In these embodiments, either a contact on the shear plate may be conductive and/or the tactile switch itself may include a conductive nub or contact point for interacting with the button. These embodiments allow the tactile switch to be electrically connected to one or more elements within the housing.

In some embodiments, the tactile switch assembly may also include one or more sensing elements and/or input/output elements on, or incorporated into, the user input button. Because the communicating component electrically connects the user input button to one or more internal components of the wearable device, the sensors and/or other electronic components on the user input button may be in communication with the shear plate and signals from the sensors and/or other components may be transmitted from the user input button via an electrical contact on the shear plate to one or more processing elements. In some embodiments, a wire, flex, trace or other electrical element may electrically connect the shear plate and input/output element, such as the user input button.

The tactile switch assembly may be configured to receive multiple types of user inputs, such as, but not limited to, rotational inputs, translating inputs, and/or electrical inputs. For example, in one embodiment, the tactile switch assembly may include the shear plate and may be configured to receive rotational inputs, as well as translating inputs, without damaging the tactile switch. Additionally or alternatively, the tactile switch assembly may be in electrical communication with one or more components within the electronic device, even as the input member is moved (e.g., translated and/or rotated). In these examples, if rotational input is not desired or if the rotational input will be limited, the shear plate may be omitted and the tactile switch itself may include a conductive contact, such as an electrically conductive nub.

Turning now to the figures, an illustrative wearable electronic device will now be discussed in more detail. FIG. 1 is a top plan view of a wearable electronic device. FIG. 2 is a simplified block diagram of the wearable electronic device of FIG. 1. With reference to FIGS. 1 and 2, the wearable electronic device 100 may include a hub 102 or computing center. In embodiments where the electronic device 100 is configured to be worn by a user, the device 100 may include one or more straps 104, 106 that may connect to opposite sides of the hub 102. Each of the straps 104, 106 may wrap around a portion of a wrist, arm, leg, chest, or other portion of a user's body to secure the hub 102 to the user. For example, the ends of each of the straps 104, 106 may be connected together by a fastening mechanism 108. The fastening mechanism 108 can be substantially any type of fastening device, such as, but not limited, to, hook and loop, magnetic fasteners, snaps, buttons, clasps or the like. However, in one embodiment, such as the one shown in FIG. 1, the fastening mechanism 108 is a buckle including a prong 134 or element that can be inserted into one or more apertures 112 in the second strap 106 to secure the first and second straps 104, 106 together.

The hub 102 of the wearable electronic device generally contains the computing and processing elements of the wearable electronic device 100. FIG. 3 is a partial cross-section view of the hub 102 taken along line 3-3 in FIG. 1. With reference to FIGS. 1-3, the hub 102 may include a display 116 at least partially surrounded by an enclosure 114. In some embodiments, the display 116 may form a face of the hub 102 and the enclosure 114 may wrap around the edges and backside of the display 116. Additionally, the internal components of the wearable device 100 may be contained within the enclosure 114 between the display 116 and the enclosure 114. The enclosure 114 protects the internal components of the hub 102, as well as connects the display 116 to the hub 102.

The enclosure 114 may be constructed out of a variety of materials, such as, but not limited to, plastics, metals, alloys, and so on. The enclosure 114 includes a button aperture 172 (see FIG. 3) to receive the tactile switch assembly 110 or a portion thereof. The button aperture 172 forms a channel within a sidewall 188 of the enclosure 114 and extends from an outer surface 188 of the enclosure 114 to an interior surface 190. The button aperture 172 generally is configured to correspond to a button of the tactile switch assembly 110. That said, the button aperture 172 may be otherwise shaped and sized.

With reference to FIG. 3, in some embodiments, the enclosure 114 may include a sleeve 220 lining the button aperture 172. In these embodiments, the button and/or other portions of the tactile switch assembly may be received into the sleeve 220, which connects the tactile switch assembly 110 to the enclosure 114. The sleeve 220 may act to help seal the cavity 139 of the enclosure 114, as well as help to secure one or more components of the tactile switch assembly to the enclosure. In some embodiments the sleeve 220 may be an insulating material and may insulate the tactile switch or portions thereof, such as the head and coupling, from the enclosure. As will be discussed in more detail below, this may allow the tactile switch assembly to measure one or more characteristics of a user's body, such as a user's heart rate.

The enclosure 114 may also include a groove 186 defined on a top surface to receive the display 116. With reference to FIGS. 1 and 3, the display 116 may be connected to the enclosure 114 through adhesive or other fastening mechanisms. In this example, the display is seated within a recessed portion or groove of the enclosure and the enclosure wraps around the edges of the display. However, in other embodiments, the display and enclosure may be otherwise connected together.

The display 116 may be substantially any type of display screen or device that can provide a visual output for the wearable device 100. As an example, the display 116 may be a liquid crystal display, a light emitting diode display, or the like. Additionally, the display 116 may also be configured to receive a user input, such as a multi-touch display screen that receives user inputs through capacitive sensing elements. In many embodiments, the display 116 may be dynamically variable; however, in other embodiments, the display 116 may be a non-electronic component, such as a painted faceplate, that may not dynamically change.

The display 116 includes a plurality of icons 118, 120 or other graphics that are selectively modifiable. As an example, a first graphic 118 may include a time graphic that changes its characters to represent the time changes, e.g., numbers to represent hours, minutes, and seconds. A second graphic 120 may include a notification graphic, such as, battery life, messages received, or the like. The two graphics 118, 120 may be positioned substantially anywhere on the display 116 and may be varied as desired. Additionally, the number, size, shape, and other characteristics of the graphics 118, 120 may be changed as well.

The tactile switch assembly 110 is operably connected to the enclosure 114. The tactile switch assembly 110 will be discussed in more detail below, but generally allows a user to provide input to the wearable electronic device 100, as well can provide haptic feedback to a user.

With reference to FIG. 2, the wearable electronic device includes a plurality of processing or computing elements. For example, the wearable electronic device 100 may include a power source 122, one or more processing elements 124, a memory component 128, one or more optional sensors 126, and an input/output component 130. Each of the internal components may be received within the enclosure 114 and may be in communication through one or more systems buses 132, traces, printed circuit boards, or other communication mechanisms.

The power source 122 provides power to the hub 102 and other components of the wearable device 100. The power source 122 may be a battery or other portable power element. Additionally, the power source 122 may be rechargeable or replaceable.

The processing element 124 or processor is substantially any type of device that can receive and execute instructions. For example, the processing element 124 may be a processor, microcomputer, or the like. Additionally, the processing element 124 may include one or more processors and in some embodiments may include multiple processing elements.

The one or more sensors 126 may be configured to sense a number of different parameters or characteristics that may be used to influence one or more operations of the wearable electronic device 100. For example, the sensors 126 may include accelerometers, gyroscopes, capacitive sensors, light sensors, image sensors, pressure or force sensors, or the like. As will be discussed in more detail below, one or more of the sensors 126 may be used in conjunction with the tactile switch assembly 110 or separate therefrom, to provide user input to the hub 102. Certain embodiments may omit the sensor or sensors 126.

With continued reference to FIG. 2, the memory component 128 stores electronic data that may be utilized by the wearable device 100. For example, the memory component 128 may store electrical data or content e.g., audio files, video files, document files, and so on, corresponding to various applications. The memory 128 may be, for example, non-volatile storage, a magnetic storage medium, optical storage medium, magneto-optical storage medium, read only memory, random access memory, erasable programmable memory, or flash memory.

The input/output interface 130 may receive data from a user or one or more other electronic devices. Additionally, the input/output interface 130 may facilitate transmission of data to a user or to other electronic devices. For example, the input/output interface 130 may be used to receive data from a network, or may be used to send and transmit electronic signals via a wireless or wired connection (Internet, WiFi, Bluetooth, and Ethernet being a few examples). In some embodiments, the input/output interface 130 may support multiple network or communication mechanisms. For example, the network/communication interface 130 may pair with another device over a Bluetooth network to transfer signals to the other device, while simultaneously receiving data from a WiFi or other network.

The tactile switch assembly 110 will now be discussed in more detail. The tactile switch assembly 110 may include a button 148, a coupling 218, a shear plate 156, and a tactile switch 214. The components of the tactile switch may be operably connected together and select components may be in electrical communication with one another.

With reference to FIG. 3, the button 148 forms a user interface for the tactile switch assembly 110 and extends outwardly from the enclosure 114. For example, the button 148 may be an input member, such as a button or switch that is translatable and/or rotatable relative to the housing. The ability of the button 148 to translate and rotate relative to the enclosure allows a user to provide a rotational force and/or translating force to the tactile switch assembly. In some embodiments, the button 148 may form a crown for the wearable electronic device 100 and in other embodiments the button 148 may form an input button or switch for the electronic device. The button 148 may generally be a flange shaped member that may have a cylindrical body and a rounded or flat top. The button 148 includes an outer surface 232 that is configured to receive a user input and a stem 150 that extends from an interior surface 234 of the button 148. The stem 150 may define a coupling aperture 236 that extends longitudinally along a length or a portion of a length of the stem 150. In other words, the stem 150 may be hollow or partially hollow. In some embodiments, the button 148 and/or stem 150 may be made of an electrically conductive material and/or may be laced or doped with an electrically conductive material.

With continued reference to FIG. 3, the coupling 218 may be a linkage, such as a shaft, that mechanically and/or electrically couples the button 148 to the tactile switch 214. The coupling 218 may be integrally formed with the button 148 or may be a separate component operably connected thereto. For example, the stem 150 of the button 148 may form the coupling member that is integrally formed with the button. The coupling 218 may be made of a conductive material, such as one or more metals or metal alloys. Due to the conductive characteristics, the coupling 218 may further act to electrically couple the button 148 to the tactile switch 214 and shear plate 156, although in other embodiments a wire, flex or other circuit may electrically couple the button and switch, either with or without including the shear plate in such an electrical connection. The coupling may also include a low-friction material, such as graphite, on its bottom surface, which allows the coupling to more easily rotate, even as it is operably associated with the shear plate.

The coupling 218 may include a shaft 240 extending from a bottom end 222. The bottom end 222 may have a larger diameter than the shaft 240. The bottom end 222 may include an annular shelf 228 that extends around an outer surface. The annular shelf 228 may be configured to seal against the inner surface of the enclosure 114 and/or sleeve 220. Additionally, the annular shelf 228 may be configured to secure a trackable element 146, sensor, or sealing member to the coupling 218.

The bottom end 222 of the coupling 218 forms a joint to operably connect the coupling 218 to the shear plate 156. In these embodiments, the coupling 218 may include an engagement feature 226 connected to the bottom end 222. The engagement feature 226 is configured to rotatably connect to the shear plate 156 and maintain an electrical connection to the shear plate 156 either while the coupling is rotating or stationary; this will be discussed in more detail below. As shown in FIG. 3, in one embodiment, the engagement feature 226 includes a recess 224 formed into the bottom surface 244 of the bottom end 222. An annular wall 242 extends from the bottom surface 244 surrounding the recess 224.

Figure 10:
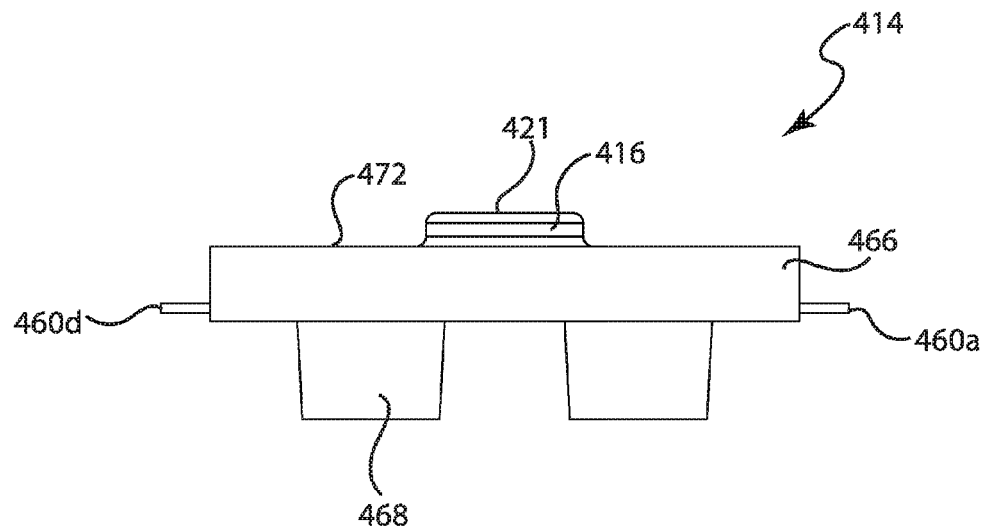
FIG. 10 is a front elevation view of yet another example of a tactile switch that can be used with the tactile switch assembly of FIG. 4.

With continued reference to FIG. 3, the shear plate 156 may be positioned between the coupling 218 and the tactile switch 214. In some embodiments, the shear plate 156 may be integrated with the tactile switch 214, one example of which is shown in FIG. 10. In other embodiments, such as the one shown in FIG. 3, the shear plate 156 may be a separate component operably connected to the tactile switch 214. As will be discussed in more detail below, the shear plate 156 may substantially prevent shearing forces from the coupling from being transmitted to the tactile switch 214.

The shear plate 156 may include an electrical contact 158 that extends upwards from a main body 250. The electrical contact 158 is a conductive material or otherwise laced with a conductive material such that the electrical contact 158 may transmit electrical signals. The main body 250 may be shaped as a plate or otherwise be configured to extend across a length and/or width of the tactile switch 214. The shear plate 156 may be at least partially rigid and configured to transfer a force from the coupling 218 to the tactile switch 214, which will be discussed in more detail below. Additionally, the shear plate 156 may include one or more terminals or connection mechanisms to connect the electrical contact 158 to the processing element 124 and/or power source.

The tactile switch 214 may include a nub 216 and a collapsible dome 252. The nub 216 interacts with a contact element on an interior of the dome 252 to indicate when the switch sensor 160 has been activated. For example, when the contact element 168 contacts the bottom of the switch, a circuit may be completed, a signal may be stimulated or created, or the like. The dome 252 is a resilient and flexible material that collapses or flexes upon a predetermined force level and returns to its original shape when a force is removed. The dome 252 may be a thin metal dome, a plastic dome, or other may be constructed from other materials. The dome 252 may produce an audible sound, as well as an opposing force, in response to a collapsing force exerted by a user. The audible sound and opposing force provide feedback to a user when a user compresses the dome 252. The nub 216 is connected to the dome 252 and when a force is applied to the nub 216, the nub 216 collapses the dome 252.

In some embodiments, the wearable electronic device may include a trackable element 146 and a sensing element 142. The sensing element 142 is configured to detect the trackable element 146 in order to detect inputs to the button 148. For example, in some embodiments, the button 148 (or other button) may be rotatable to provide a first input and compressible to provide a second input. In this example, the sensing element 142 may sense rotational input by tracking the position of the trackable element 146 which may be mounted to the coupling 218 and/or stem 150. As one example, the trackable element 146 may be a magnetic element and the sensing element 142 may include a magnetic field sensor, such as one or more Hall effect sensors, that may be used to track rotation of the trackable element 146. As yet another option, rotation may be optically sensed. The trackable element 146 may be a pattern, such as a series, set or other pattern of light and dark marks, stripes, or the like, or areas of varying reflectance, polish, and so on. The sensing element 142 may receive light generated by a light source (not shown) and reflected off the trackable element. The reflected light may vary with the pattern of the trackable element, such that the reflected light may be sensed and the pattern of the trackable element on which the light impinged may be determined. Thus, if the pattern of the trackable element is sufficiently unique along its surface, the button input may be sensed. As still another option, the pattern of the trackable element may vary along a circumference of the trackable element and the trackable element may rotate as the shaft 240 rotates. Thus, a rotational position of the shaft may be determined from the trackable element 146. As still another option, the trackable element may be incorporated onto the shaft itself, and may not be a separate piece. That is, the shaft may be marked as discussed above in certain embodiments.

The tactile switch assembly 110 optionally may further include one or more sensors 126 positioned within or connected to the button 148. The sensors 126 may be electrically connected to the coupling 218, either via one or more wires or pathways within the button 148 or in instances where the button 148 may be a conductive material. The sensor 126 may be configured to sense one or more characteristics and relay data to the processing element 124 via the coupling 218.

With reference to FIG. 3, assembly of the tactile switch assembly 110 within the wearable electronic device 100 will now be discussed in more detail. The tactile switch 214 is connected to a substrate 166 or other supporting structure within the cavity 139 of the wearable device 100. The substrate 166 and/or switch 214 may be in electrical communication with the processing element 124 (see, FIG. 2). The dome 252 is oriented towards the wall 190 of the enclosure 114 such that the nub 216 is substantially aligned with the button aperture 172. The shear plate 156 is positioned over and operably connected the tactile switch 214. The shear plate 156 is orientated such that the electrical contact 158 may be substantially aligned with the nub 216 of the switch 214.

With continued reference to FIG. 3, the coupling 218 is operably connected to the shear plate 156 and electrically connected to the contact 158. In particular, the electrical contact 158 may be received into the recess 224 formed in the bottom surface 244 of the coupling 218. The annular wall 242 surrounds the electrical contact 158. In some embodiments, the electrical contact 158 may be in contact with the interior of the annular wall 242 and/or the end wall of the recess 224 of the coupling. In this manner, the coupling 218 may be connected to shear plate 156 and may also be in electrically communication therewith.

The shaft 240 of the coupling 218 extends through the button aperture 172 and is received into the coupling aperture 236 of the stem 150. A sealing member 154, such as an O-ring, cup seal, or membrane, is received around the shaft 240 and seals against the sleeve 220 or the interior walls of the enclosure 114. The button 148 extends outwards from the coupling 218 and extends past the outer edge of the enclosure 114.

Operation of the tactile switch assembly 110 with the wearable device 100 will now be discussed in more detail. If a user provides a rotational force to the button 148, the stem 150 and button 148 will rotate in the direction of the force. The rotation of the button 148 causes the coupling 218 to rotate along with the button 148. As the coupling 218 rotates, the trackable element 146 rotates, allowing the sensing element 142 to track the rotation of the coupling 218, which may be correlated to the user input to the button 148. Additionally, the coupling 218 rotates around the electrical contact 158 of the shear plate 156. The annular wall 242 prevents the coupling 218 from rotating off-axis from the contact 158, as well as help to secure the two components together. In some embodiments the electrical contact 158 may be a brush contact or may otherwise be configured to maintain an electrical connection between the walls defining the recess 224 and the annular wall 242 of the coupling 218, without substantially hindering the rotation of the coupling 218. Additionally, because the coupling 218 rotates around the electrical contact 158, the rotational force experienced by the coupling 218 may not be transmitted to the tactile switch 214 positioned below the shear plate to which the electrical contact is connected. By preventing the shearing forces from being transmitted to the tactile switch 214, the tactile switch 214 may be prevented from rotating, which could damage the switch, cause the switch to become displaced relative to the coupling, and/or otherwise damage the tactile switch. In some embodiments, the electrical contact 158 may be configured to experience shear forces around 20N and torque at least higher than 10N-mm. This allows the tactile switch assembly 110 to receive rotational inputs to the button 148, while maintaining an electrical connection between the coupling and the contact, without damaging either of the components.

Figure 4:
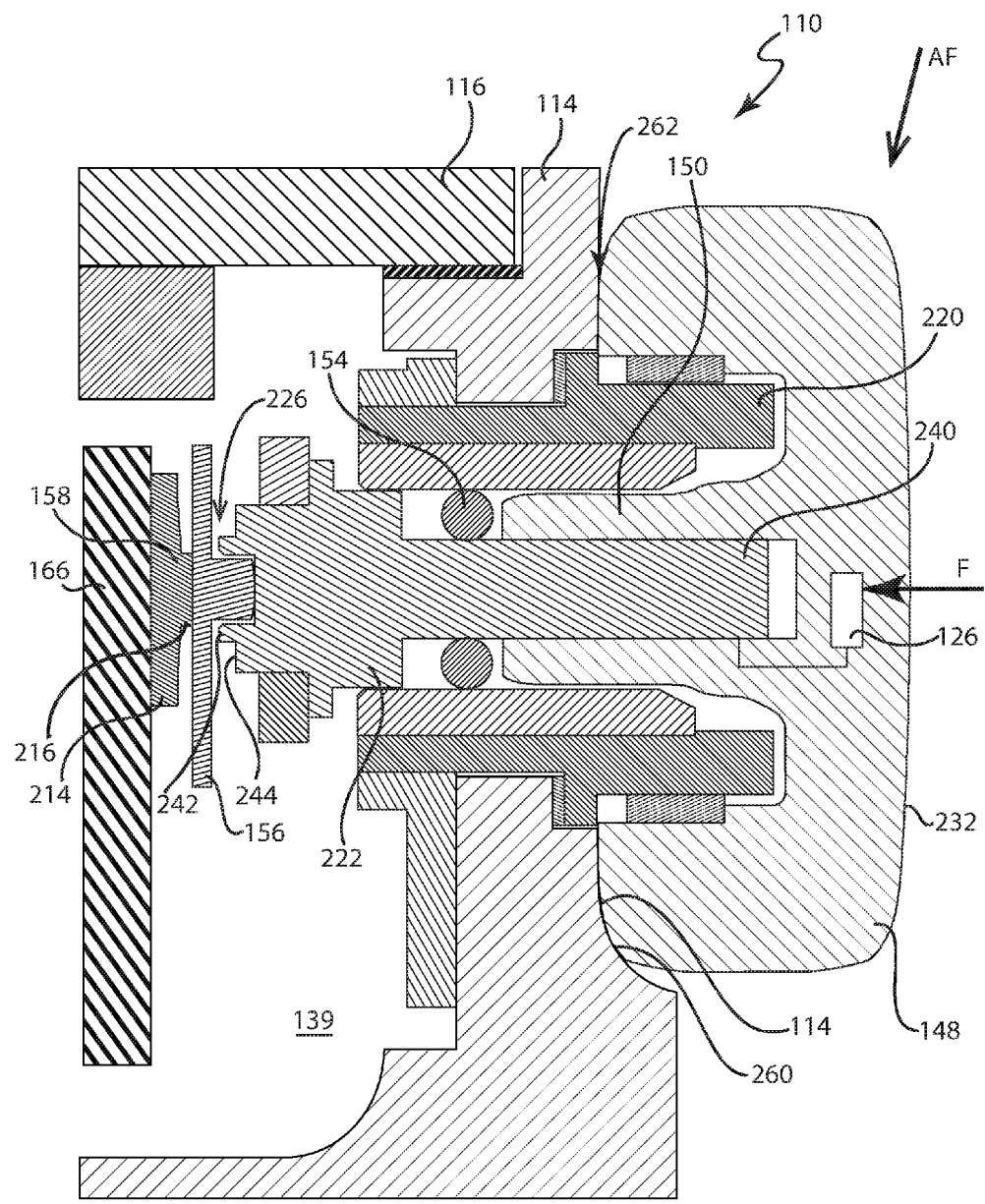
FIG. 4 is a cross-section view similar to FIG. 3 showing a user input force being applied to a button of a tactile switch assembly for the electronic device.

FIG. 4 is a cross-section view of the wearable electronic device 100 similar to FIG. 3 but illustrating a compression force applied to the button 148. With reference to FIG. 4, as the user applies a force, either an angled force AF or an on-axis force F, the button 148 moves towards the sidewall 260, such that the bottom surface 262 of the button 148 abuts against the enclosure 114. Lateral movement of the button 148, causes the coupling 218 to move correspondingly and slide further into the cavity 139. As the coupling 218 moves into the cavity 139, it transmits the force AF, F to shear plate 156. In particular, the end wall of the recess presses against the electrical contact 158, which compresses against the nub 216 of the dome 252. In some embodiments the tactile switch assembly 110 may be configured to receive user input forces ranging between 1 to 3 Newtons. Because the shear plate 156 may be at least somewhat rigid, the shear plate 156 transmits the force from the coupling 218 to the dome 252 causing it to collapse. As the dome 252 collapses, an electrical contact within the tactile switch 214 touches the interior surface of the dome to complete an electrical connection, indicating the user input.

Once the force has been removed from the button 148, the dome resiliently returns to its original position, providing a biasing force against the coupling 218 to return both the button and the coupling to their original positions. In some embodiments, the tactile switch may include a separate biasing element, such as a spring, that exerts a force (either directly or indirectly via the shear plate) against the coupling. In these embodiments, the button 148 and the coupling 218 may return to their original positions prior to the user translation force F applied to the button 148.

In some embodiments, the button aperture 172 may be sufficiently large that the tactile switch 214 can be activated by the angled force AF, even when the tactile switch 214 is positioned directly beneath the coupling. In other words, the angled force AF or other off-axis force may activate the tactile switch 214 when the frictional engagement of the stem 150 and/or coupling 218 within the button aperture 172 sidewall is insufficient to resist the angled force AF. As the angle increases, the frictional force acting on the stem and/or coupling increases and by varying the size of the stem and/or button aperture, a predetermined angle range may be selected for which the angled force AF can activate the switch. For example, a maximum angle of the input force can be selected and when the force is below that angle, the angled force can activate the tactile switch 214 and when the angled force is at or above the maximum angle, the input button may not be activated. As an example, a force applied to the input button at an angle up to 30 or 45 degrees may be able to activate the tactile switch 214.

With continued reference to FIG. 4, as the tactile switch 214 is compressed by the coupling 218, the coupling 218 remains in electrical communication with the electrical contact 158. This allows the sensor 126 to remain in communication with the one or more processing elements 124 via the shear plate 156 and/or the button 148 to remain electrically connected to the shear plate 156.

The tactile switch 214 of the present disclosure allows a user to provide multiple types of inputs to the wearable device 100, e.g., rotational, translational, and angled. Additionally, the tactile switch assembly 110 allows the movable components, in particular the button 148 and coupling 218, to remain in electrical communication with the shear plate 156 (and thus other electrical components within the device), without restricting movement. This allows one or more sensing elements 126 on the button 148 to provide signals to non-movable components or other components positioned within the enclosure 114. The sensing elements 126 may receive power via the coupling 218 and the button 148.

In some embodiments, the tactile switch assembly 110 optionally may be used as a physiological sensor, although this functionality may be omitted from certain embodiments. For example, in one embodiment, the enclosure 114 may be electrically conductive and when worn by a user may be in communication with the user's skin. With reference to FIG.

3, in this embodiment the sleeve 220 may be an insulating material, such as rubber, plastic, or the like, and isolates the button 148, stem 150, and coupling 218 from the conducive housing 114. To measure one or more characteristics of the user's heart, such as by an electrocardiograph (ECG), the user may press his or her finger on the button 148. In this example, the wearable device 100 may be worn around a user wrist and the finger placed on the button 148 may be from the opposite arm as the arm wearing the device 100. The connection between the user's finger and the button 148 may act as a first lead for the ECG and the connection between the user's wrist (or other portion of the arm) may act as the second lead for the ECG.

As the user places his or her finger on the button 148, an electrical connection via the coupling 218 and electrical contact 158 allows for a second reference point. In this manner, voltage signals detected at the first location can be compared with voltage signals detected at the second location and subtracted to detect rise and falls between the two signals. These rise and falls can be correlated to the rhythm of a user's heart. Additionally, in some embodiments, the device 100 may use one of the connections to the user's skin to send a pulse or signal through the user in order to measure the ECG characteristics of the user's heart.

Brush Contact

Figure 5:
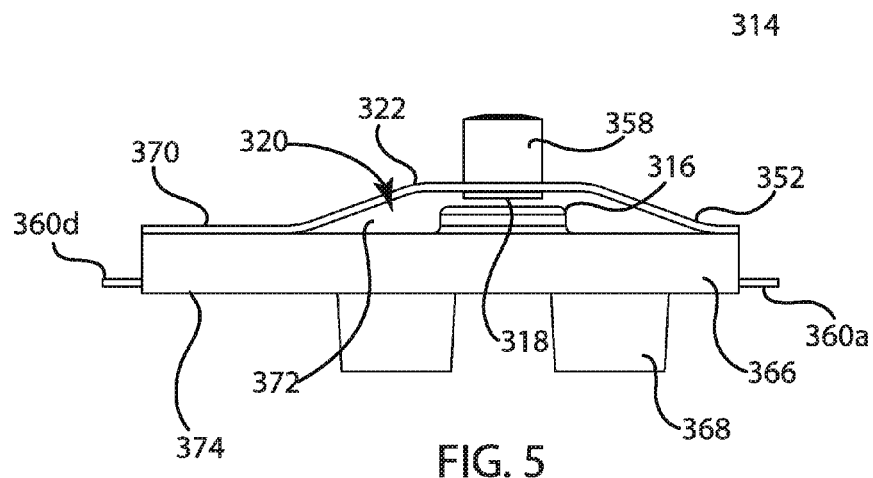
FIG. 5 is a front elevation view of another example of a tactile switch that may be used with the tactile switch assembly of FIG. 4.
Figure 6:
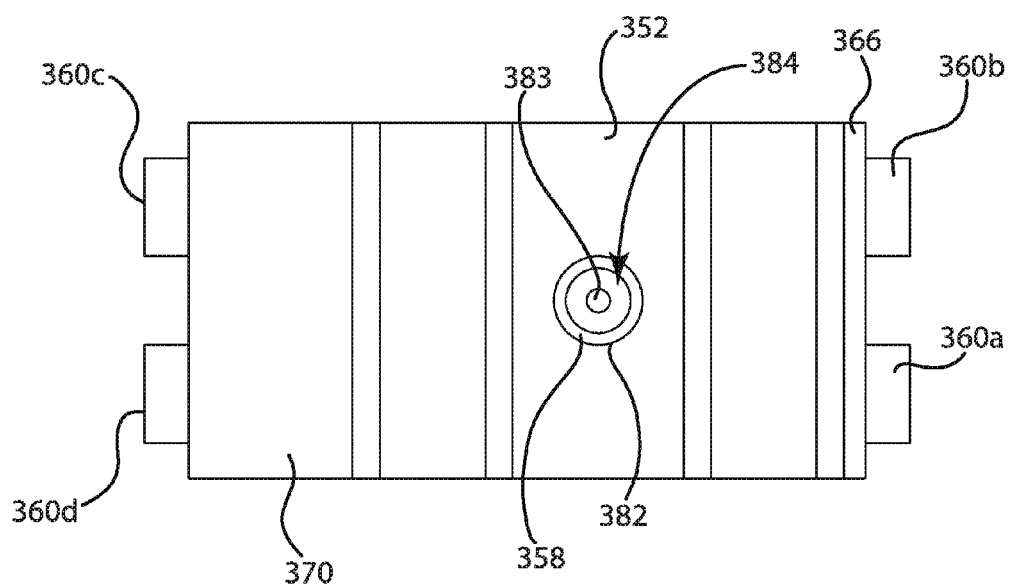
FIG. 6 is a top plan view of the tactile switch of FIG. 5.
Figure 7:
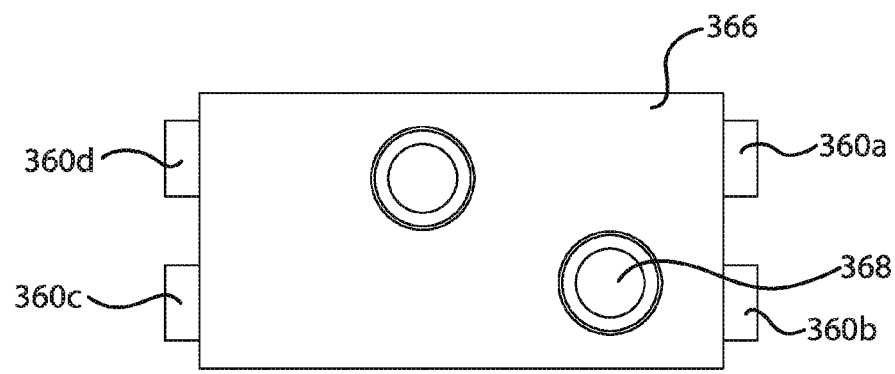
FIG. 7 is a bottom plan view of the tactile switch of FIG. 5.

In some embodiments, the tactile switch itself may include an electrical contact and the shear plate may be omitted or integrated with the tactile switch. FIGS. 5-7 illustrate various views of another examples of the tactile switch removed from the wearable electronic device. In these embodiments, the tactile switch assembly may be configured to receive one or more input types, as well as remain in electrical communication with one or more elements within the device. The tactile switch 314 of FIGS. 5-7 may be substantially the same as the tactile switch 214 but may be integrally formed with an electrical contact on an outer surface of the dome. With reference to FIGS. 5-7, in this embodiment, the tactile switch 314 may include a substrate 366, one more supports 368 extending from a bottom surface 374 of the substrate 366. The supports 368 support the tactile switch 314 within the wearable electronic device 100, such as on the substrate 166.

The tactile switch 314 may include a nub 316 extending form a top surface 372 of the substrate 366. The nub 316 forms an electrical contact for the dome 352, which will be discussed in more detail below. The nub 316 may be in electrical communication with one or more of the connection terminals 360a, 360b, 360d, 360e, which may be in communication with the processing element 124 (see, FIG. 2). The nub 316 may be a conductive protrusion or may include a contact pad or other conductive segment that is configured to be in selective communication with a corresponding dome contact.

With reference to FIG. 5, the dome 352 may be resilient and may be configured to collapse under a predetermined user force and spring back to its an initial position. The dome 352 may include a leg 370 extending form one side of the dome 352. The leg 370 may support one or more electrical communication mechanisms, such as, but not limited to, flexible circuit (flex), wiring, or the like. The dome 352 may also define a dome cavity 320 which is positioned over the base contact 316. A top surface 322 of the dome 352 may be configured to be spatially separated from a top surface of the nub 316 such that the dome may only touch the contact 316 when a sufficient force is applied to the top surface 322 of the dome. A dome contact 318 may be operably connected to an interior surface of the dome 352 and be at least partially aligned with the nub 316.

The dome 352 may be a non-conductive material, such as plastic. In one embodiment, the dome 352 may be an injection molded plastic. However, as mentioned above, one or more components of the dome 352 may include electrically conductive components, such as a flexible circuit (flex), copper wiring, and so on. Alternatively, the dome 352 may be a metal element or other material that is electrically conductive and may include one or more insulating elements connected thereto.

With reference to FIGS. 5 and 6, the tactile switch 314 may further include an electrical contact 358, which may replace the contact 158 of the shear plate 156, such that the shear plate may be omitted. The electrical contact 358 may be operably connected to the top surface 322 of the dome 352. In embodiments where the tactile switch may be used to receive rotational inputs, the electrical contact 358 may form a brush contact for the coupling 318 to electrically connect the tactile switch 314 and the coupling 318. In this manner, the electrical contact may be substantially similar to the electrical contact 158; however, in this embodiment, the electrical contact 358 may be formed integrally with the dome 352. However, in embodiments where rotational inputs are not desired, the electrical contact 358 may be a conductive surface that does not receive shear forces.

The electrical contact 358 is in communication with one of the connection terminals 360a, 360b, 360c, 360d. For example, the electrical contact 358 may be in communication with lead 360a. In some embodiments, the dome may include a flex or other shear plate that couples the electrical contact 358 to the lead 360a or alternatively, the dome 352 itself may be conductive and act to couple the two components together.

As shown in FIG. 3, the electrical contact 158 may be received into the coupling 218. However, in some embodiments, such as the embodiment illustrated in FIG. 6, the electrical contact 358 may define a receiving cavity 384 surrounded by an annular wall 382. In these embodiments, one or more portions of the coupling 318 may be received into a recess or aperture defined within the electrical contact. In this manner, the coupling 218 may rotate within the electrical contact 358, contacting the interior walls of the annular wall 382.

Figure 8:
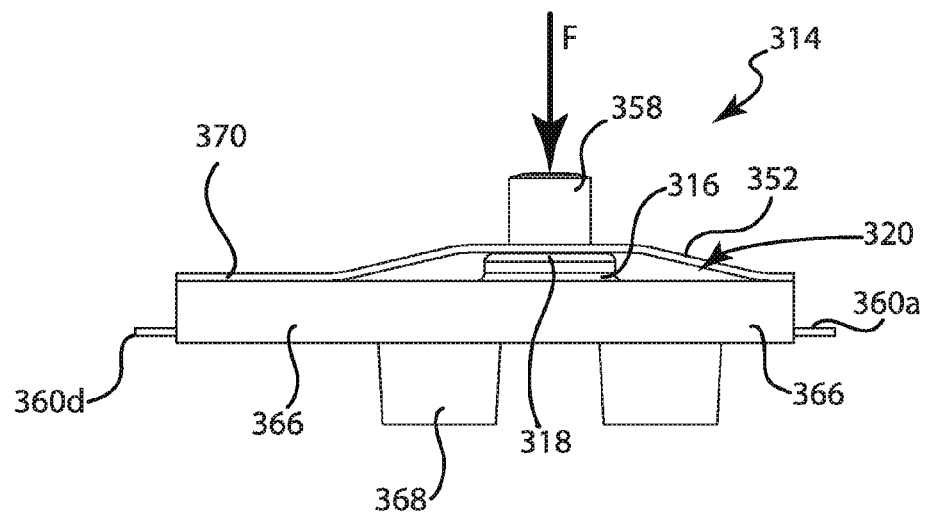
FIG. 8 is a front elevation view of the tactile switch of FIG. 5 as a translating force is applied thereto.

Operation of the tactile switch assembly will now be discussed in more detail. With reference to FIGS. 3 and 8, as the coupling 218 is compressed, e.g., due to the user input force F, the coupling 218 compresses the electrical contact 358. As the electrical contact 358 is compressed, the force is transmitted to the dome 352, which collapses, pressing the dome contact 318 onto a top surface of the nub 316. As the dome contact 318 touches the nub 316, an electrical signal is created and transmitted via one of the terminals 360a, 360b, 360c, 360d to the processing element 124 (see, FIG. 2). The processing element 124 then registers the user input to the tactile switch 314.

Figure 9:
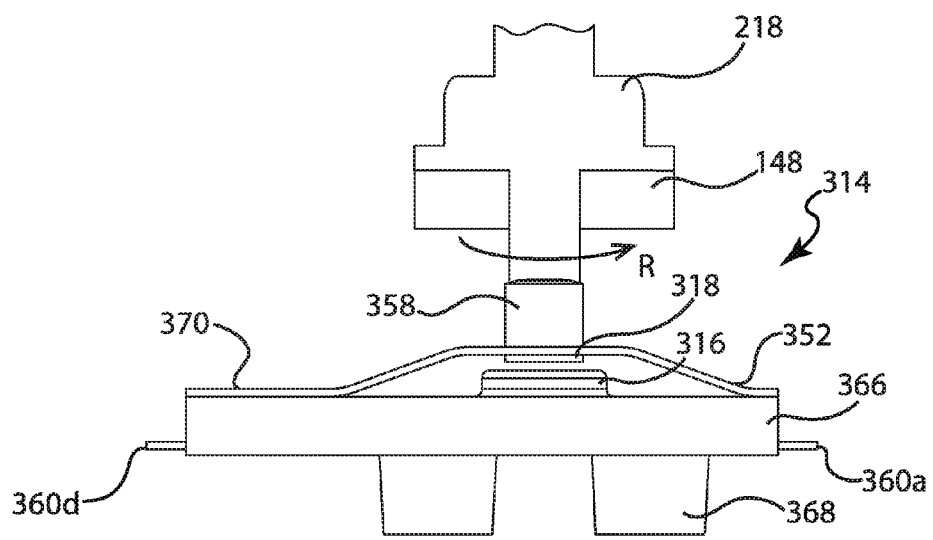
FIG. 9 is a front elevation view of the tactile switch of FIG. 5 as a rotating force is applied thereto.

FIG. 9 is a simplified front elevation view of the tactile switch and coupling as the user applies a rotational force. With reference to FIG. 9, in instances where the user may provide a rotational input force R to the tactile switch assembly 310, the coupling 218 may receive the force applied to the button 148, causing the coupling 218 to rotate correspondingly. In embodiments where the coupling 218 is received into a recess 384 (see, FIG. 6) of the electrical contact 358, the coupling 218 may rotate within the annular wall 382, maintaining a connection between the walls and/or bottom surface 383 (see, FIG. 6) of the electrical contact 358. This allows the coupling 218 to rotate along with a rotational input from the user, while still maintaining an electrical connection to the tactile switch 314.

Conductive Nub

In some embodiments, the nub of the tactile switch may be conductive and the shear plate may be omitted. For example, in some embodiments, the user input surface may be configured to translate, such as moving horizontally or vertically relative to the housing, and in these embodiments, the tactile switch may not receive shearing forces. Alternatively, the nub of the tactile switch may be configured to receive shear forces, while still activating the tactile switch.

Figure 11:
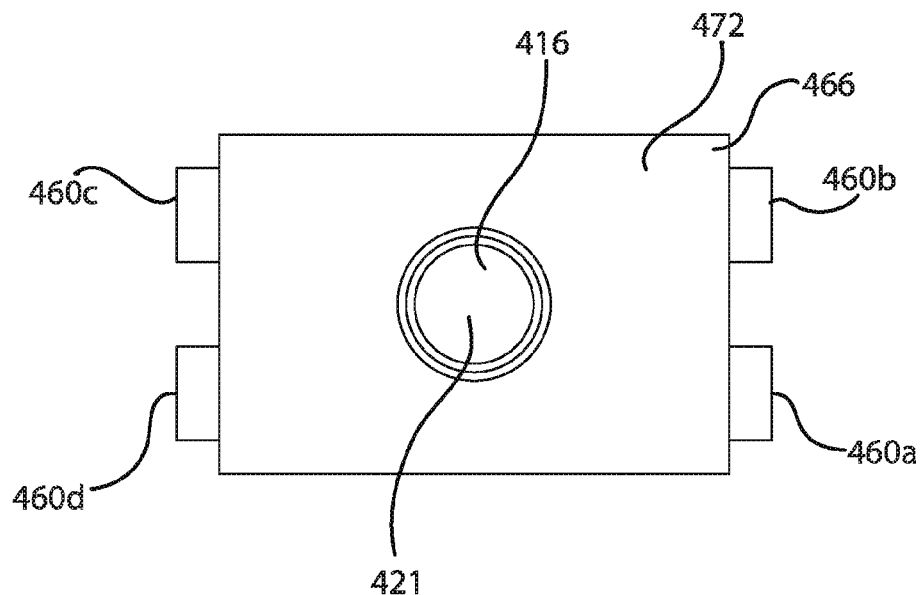
FIG. 11 is a top plan view of the tactile switch of FIG. 10.
Figure 12:
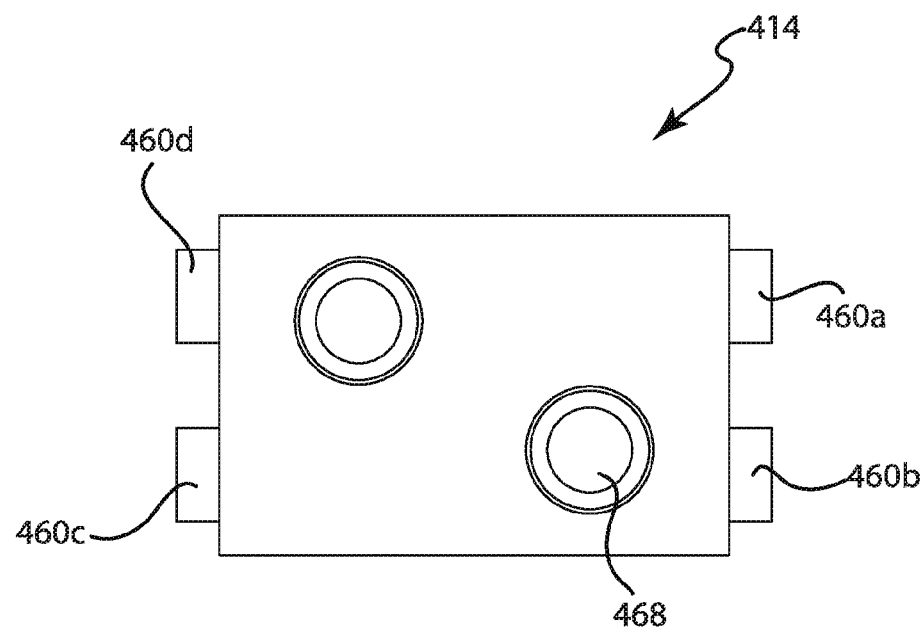
FIG. 12 is a bottom plan view of the tactile switch of FIG. 10.

FIGS. 10-12 illustrate various views of another example of the tactile switch. With reference to FIGS. 10-12, the tactile switch 414 in this embodiment may be substantially similar to the tactile switches 114, 314, but may include a conductive nub. In other words, the shear plate may be integrated with the nub of the tactile switch. In particular, the tactile switch 414 may include a substrate 466, one or more substrate supports 468, a plurality of connection terminals 460a, 460b, 460c, 460d, and the nub 416.

With reference to FIGS. 10 and 11, the nub 416 may be operably connected to the top surface 472 of the substrate 466. In some embodiments, the substrate 466, or at least portions of the top surface 472, may be insulated to electrically separate the various terminals of the switch 414, as well as the nub 416 for certain components of the switch 414. The nub 416 may include a conductive portion, such as pad 421 on a top surface of the nub 416, or the nub 416 may be made of a conductive material, or another material laced with conductive elements. One or more of the terminals is in electrical communication with the nub 416. For example, terminal 460d may be in communication with the nub 416, whereas terminals 460a, 460b, 460c may be used as one or more contacts for the switch contact within the substrate 466. In these embodiments, the nub 416 may act as a brush contact to allow the coupling to rotate.

The tactile switch 414 may be used with the tactile switch assembly 110 of FIG. 3. In these embodiments, the nub 416 may be received into the recess 224 of the coupling 218. Similarly to the electrical contact 158, the nub 416 may be received between the sidewalls of the annular wall 242, which operably connects the nub and the coupling 218.

In embodiments where the tactile switch assembly 110 includes the tactile switch 414 of FIGS. 10-12, the nub 416 may be configured to not only be conductive, but may also resist shear forces and overload. For example, with the shear plate omitted, the nub 416 may experience shear forces as the coupling 218 rotates on top of the nub 416 and around the nub 416. Additionally, the nub is configured to receive mechanical inputs, such as the force of the coupling 218, and under the load of the force, the nub 416 completes a switch circuit by connecting one or more of the terminals together. As one example, the nub 416 may at least partially compress when a compressive force is applied to the button 148, allowing the nub 416 to function as the dome, to provide tactile feedback to a user as well as create a signal corresponding to the user's input.

CONCLUSION

The foregoing description has broad application. For example, while examples disclosed herein may focus on a wearable electronic device, it should be appreciated that the concepts disclosed herein may equally apply to substantially any other type of electronic device. Similarly, although the input button may be discussed with respect to a crown for a watch, the devices and techniques disclosed herein are equally applicable to other types of input button structures. Accordingly, the discussion of any embodiment is meant only to be exemplary and is not intended to suggest that the scope of the disclosure, including the claims, is limited to these examples.

What is claimed is:

1. A watch comprising:
    an enclosure defining a watch body;
    a crown positioned along an exterior surface of the enclosure and configured to receive a translational input and a rotational input; and
    a touch-sensitive display that displays a first group of graphical objects and is configured to receive a touch input, wherein the touch-sensitive display is configured to:
        display movement of the first group of graphical objects in response to the rotational input and the touch input; and
        display a second group of graphical objects in response to the translational input.

2. The watch of claim 1, wherein:
    the enclosure defines an interior volume and an opening extending into the interior volume;
    the crown is part of a switch assembly having a shaft that extends into the opening; and
    the watch further comprises:
        a first sensor positioned within the interior volume and configured to detect the rotational input; and
        a second sensor positioned within the interior volume and configured to detect the translational input.

3. The watch of claim 2, wherein:
    the first sensor comprises an optical sensor that is configured to detect the rotational input using reflected light; and
    the second sensor comprises a switch having a dome that is configured to collapse in response to the translational input.

4. The watch of claim 1, wherein the touch-sensitive display is configured to move the first group of graphical objects in a continuous manner in accordance with the rotational input and the touch input.

5. The watch of claim 1, wherein:
    the first group of graphical objects is a group of icons; and
    moving the group of icons includes scrolling the group of icons across the touch-sensitive display.

6. The watch of claim 5, wherein:
    an icon of the group of icons corresponds to a received message; and
    a position of the icon is varied in a continuous manner in accordance with the rotational input and the touch input.

7. The watch of claim 1, wherein:
    the translational input is a first translational input;
    the touch input is a first touch input; and
    the touch-sensitive display is further configured to:
        select a graphical object of the first group of graphical objects in response to a second touch input;
        display a third group of graphical objects in response to the selection of the graphical object; and
        display the first group of graphical objects in response a second translational input.

8. The watch of claim 1, wherein the movement of the first group of graphical objects is associated with a time-keeping function of the watch.

9. The watch of claim 1, wherein:
the watch further comprises a switch having a dome that is configured to collapse in response to the translational input; and
the dome is configured to produce a tactile feedback in response to the translational input.

10. A watch comprising:
an enclosure;
a touch-sensitive display coupled to the enclosure and having a touch sensor configured to detect a touch input; and
a switch assembly having a shaft that extends into the enclosure, the switch assembly configured to receive a rotational input and a translational input,
wherein the touch-sensitive display is configured to depict:
a first visual transformation of a first group of graphical objects in response to the rotational input and the touch input; and
a second visual transformation to a second group of graphical objects in response to the translational input.

11. The watch of claim 10, wherein:
the first group of graphical objects comprise icons; and
the first visual transformation comprises scrolling the icons across the touch-sensitive display.

12. The watch of claim 11, wherein the icons are scrolled in a continuous manner in response to the rotational input and the touch input.

13. The watch of claim 12, wherein:
the touch input is a first touch input; and
the touch-sensitive display is configured to select an icon of the icons in response to a second touch input.

14. The watch of claim 10, further comprising:
an optical sensor configured to detect the rotational input using light reflected from the shaft; and
a switch configured to detect the translational input.

15. The watch of claim 14, wherein:
the switch assembly includes trackable elements; and
the optical sensor is configured to detect the rotational input using the trackable elements.

16. A watch comprising:
an enclosure;
a touch-sensitive display carried by the enclosure and configured to detect touch input and display graphical objects;
a switch assembly carried by the enclosure, the switch assembly having a crown configured to receive rotational input and translational input; and
a processor operably coupled to the touch-sensitive display and the switch assembly, the processor configured to:
in response to the touch input, cause the graphical objects to move across the touch-sensitive display;
in response to the rotational input, cause the graphical objects to move across the touch-sensitive display; and
in response to the translational input, cause a display of different graphical objects on the touch-sensitive display.

17. The watch of claim 16, wherein:
the touch input is a first touch input; and
the processor is further configured to cause a selection of an object of the graphical objects in response to a second touch input.

18. The watch of claim 17, wherein:
the translational input is a first translational input; and
the processor is further configured to cause a selection of the object in response to a second translational input.

19. The watch of claim 16, further comprising:
a first sensor positioned within an interior volume of the enclosure and configured to detect the rotational input; and
a second sensor positioned within the interior volume of the enclosure and configured to detect the translational input.

20. The watch of claim 19, wherein:
the switch assembly further comprises a shaft coupled to the crown;
the first sensor is positioned proximate an end of the shaft and is configured to detect a translational movement of the shaft resulting from the translational input; and
the second sensor is positioned along a side of the shaft and is configured to detect a rotational movement of the shaft resulting from the rotational input.

* * * * *